United States Patent
Wu et al.

(10) Patent No.: US 10,962,679 B2
(45) Date of Patent: Mar. 30, 2021

(54) METHOD OF ACQUIRING ROCK COMPONENT CONTENT OF STRATUM

(71) Applicant: PetroChina Company Limited, Beijing (CN)

(72) Inventors: Hongliang Wu, Beijing (CN); Zhou Feng, Beijing (CN); Ning Li, Beijing (CN); Kewen Wang, Beijing (CN); Qingfu Feng, Beijing (CN); Gong Zhang, Beijing (CN)

(73) Assignee: PETROCHINA COMPANY LIMITED, Beijing (CN)

(*) Notice: Subject to any disclaimer, the term of this patent is extended or adjusted under 35 U.S.C. 154(b) by 277 days.

(21) Appl. No.: 15/942,356

(22) Filed: Mar. 30, 2018

(65) Prior Publication Data
US 2018/0246254 A1  Aug. 30, 2018

Related U.S. Application Data
(63) Continuation of application No. PCT/CN2016/101644, filed on Oct. 10, 2016.

(51) Int. Cl.
*G01V 99/00* (2009.01)
*E21B 49/00* (2006.01)
(Continued)

(52) U.S. Cl.
CPC ............ *G01V 99/005* (2013.01); *E21B 49/00* (2013.01); *E21B 49/02* (2013.01); *E21B 49/08* (2013.01); *G01V 5/101* (2013.01)

(58) Field of Classification Search
USPC .......................................................... 702/11
See application file for complete search history.

(56) References Cited

U.S. PATENT DOCUMENTS

| 4,661,701 A | 4/1987 | Grau |
| 4,712,424 A | 12/1987 | Herron |

(Continued)

FOREIGN PATENT DOCUMENTS

| CN | 102071928 A | 5/2011 |
| CN | 103375166 A | 10/2013 |

(Continued)

OTHER PUBLICATIONS

European Search Report for Application No. 16861419.6, dated Dec. 6, 2019, 7 pages.

(Continued)

*Primary Examiner* — Paul D Lee
(74) *Attorney, Agent, or Firm* — Hoffman Warnick LLC

(57) ABSTRACT

Disclosed is a method of acquiring the rock component content in a stratum, the method comprising: on the basis of acquired element capture spectroscopy logging data, performing normalization processing on each element yield in the stratum rock components; on the basis of an element yield curve obtained from the normalization processing and a pre-established stratum rock interpretation model, establishing a logging curve response equation set; and utilizing the established logging curve response equation set and an optimization algorithm, calculating the content of a rock component in a stratum. The method and device can directly process element yield data of element capture spectroscopy logging, and can improve the accuracy of calculating the rock component in a stratum.

13 Claims, 3 Drawing Sheets

(51) Int. Cl.
  *G01V 5/10* (2006.01)
  *E21B 49/02* (2006.01)
  *E21B 49/08* (2006.01)

(56) References Cited

U.S. PATENT DOCUMENTS

| | | | |
|---|---|---|---|
| 4,903,527 A | | 2/1990 | Herron |
| 6,140,643 A | * | 10/2000 | Brown ................. G01N 23/085 850/10 |
| 2012/0016558 A1 | | 1/2012 | Evans et al. |
| 2015/0108339 A1 | | 4/2015 | Guo et al. |
| 2017/0219727 A1 | * | 8/2017 | Nurijanyan ............ G01V 1/282 |

FOREIGN PATENT DOCUMENTS

| | | |
|---|---|---|
| CN | 103485758 A | 1/2014 |
| CN | 103617345 A | 3/2014 |
| CN | 104316971 A | 1/2015 |
| CN | 105257286 A | 1/2016 |
| WO | 2013036327 A1 | 3/2013 |
| WO | 2015084339 A1 | 6/2015 |

OTHER PUBLICATIONS

Zhao et al., "Calculation method for natural gas reserve-production ratio in different development stages," Lithologic Reservoirs, vol. 24, No. 1, Feb. 2012, 4 pages, English Abstract Provided.

Zhang et al., "Identification of Igneous Rock Lithology by Analyzing Components of Stratum," Well Logging Technology, vol. 36, No. 1, Feb. 2012, 4 pages, English Abstract provided.

Zhang et al., "Development of Formation Element Logging Technique and Its Application," Journal of Isotopes, vol. 24, Supp 1., Dec. 2011.

Yang et al., "Porosity Estimation in Volcanic Gas Reservoir," Well Logging Technology, vol. 33, No. 4, Aug. 2009, 5 pages, English Abstract Provided.

Tan et al., "Application of Elemental Capture Spectrum (ECS) Logging in Porosity Calculation of a Volcanic Reservoir," World Well Logging Technology, Dec. 2008, 6 pages, English Abstract Provided.

International Search Report, PCT Application No. PCT/CN2016/101644, dated Jan. 13, 2017, 2 pages.

Office Action and English Translation thereof for Chinese Patent Application No. CN201501731740.7 dated Sep. 4, 2017, 12 pages.

CN Search Report and Written Opinion issued in connection with corresponding CN Application No. 2015107317407 dated Nov. 2, 2015, 4 pages, English Abstract Provided.

Feng Zhou et al. "Multimineral optimization processing method based on elemental capture spectroscopy logging," Applied Geophysics, vol. 11, No. 1 Mar. 31, 2014, Mar. 2014, pp. 41-49.

Chinese Office Action 2 and English Translation thereof for Chinese Patent Application No. CN201501731740.7 dated Jun. 7, 2018, 13 pages.

Chinese Search Report and English Translation thereof for Chinese Patent Application Application No. 2015107317407 dated May 29, 2018, 4 pages.

European Search Report for Application No. 16861419.6, dated Sep. 11, 2018, 8 pages.

* cited by examiner

METHOD OF ACQUIRING ROCK COMPONENT CONTENT OF STRATUM

CROSS-REFERENCE TO RELATED APPLICATIONS

This application claims priority to co-pending International Patent Application Serial No. PCT/CN2016/101644, filed 10 Oct. 2016, which in turn claims priority to Chinese Patent Application Serial No. 2015107317407 filed on Nov. 2, 2015 with an invention title "method and device for acquiring stratum rock component contents," each of which is incorporated herein as though fully set forth.

TECHNICAL FIELD

The present disclosure relates to the technical field of oil-gas exploration, and particularly, to a method and device for acquiring stratum rock component contents.

BACKGROUND ART

In the oil-gas field exploration, the quantitative calculation of the stratum rock component contents is the basis and key for the evaluation of the well logging interpretation. The accuracy of the calculation result directly influences the lithology identification, the stratigraphic division, the reservoir parameter calculation, the hydrocarbon reservoir prediction and analysis, the oil field region evaluation, etc. Thus, how to quickly and accurately calculate the stratum rock mineral component contents is very important to the oil-gas field exploration and development.

Currently, the prior art mainly uses two methods to calculate the stratum rock component contents. One is to directly calculate using several well logging curves sensitive to the stratum lithology changes among conventional well logging data, with a given interpretation model, based on quantitative relations between minerals, fluids and well logging responses. The other is to convert the yields of elements such as silicon, calcium, iron, magnesium and sulfur obtained by unfolding spectrums of the original measurement signal through "oxygen closing" processing, into weight percentage contents of the elements using element capture energy spectrum well logging data, and calculate the mineral percentage contents through conversion relations between the stratum elements and the rock minerals.

During implementation of the present disclosure, the inventor finds that the prior art at least has the following problems: 1) information of the elements composing the stratum rock recorded in the conventional well logging data is limited, thus the types of the calculated rock mineral components are limited, and the calculation precision is low; 2) the element capture energy spectrum well logging data processing is tedious, and the mineral contents cannot be calculated unless the yields of elements are converted into the weight percentage contents of the elements, while the conversion models between the elements and the minerals are established based on the oil field sedimentary rocks abroad and the application effects are not ideal in many regions of China; 3) the above two methods both substantively directly calculate using empirical relations between the stratum minerals and fluids and the conventional well logging or element capture energy spectrum well logging response, thus the data utilization degree is low, and the calculation precision is largely limited.

SUMMARY OF THE DISCLOSURE

An objective of the embodiments of the present disclosure is to provide a method and device for acquiring stratum rock component contents, so as to improve a calculation precision of the stratum rock component contents.

In order to achieve the above technical objective, a method and device for acquiring stratum rock component contents provided by the embodiments of the present disclosure are realized as follows.

The embodiments of the present disclosure provide a method for acquiring stratum rock component contents, comprising:

performing normalization processing on all yields of elements in acquired element capture energy spectrum well logging data;

establishing a well logging curve response equation set according to an element yield curve after the normalization processing and a pre-established stratum rock interpretation model; and calculating stratum rock component contents using the established well logging curve response equation set and an optimization algorithm.

The embodiments of the present disclosure further provide an device for acquiring stratum rock component contents, comprising:

a normalization processing unit configured to perform normalization processing of yields of elements in acquired element capture energy spectrum well logging data;

an establishment unit configured to establish a well logging curve response equation set according to the yields of the elements after the normalization processing and a pre-established stratum rock interpretation model; and a calculation unit configured to calculate stratum rock component contents using the established well logging response equation set and an optimization algorithm.

As can be seen from the technical solutions provided by the above embodiments of the present disclosure, by performing normalization processing on all yields of elements based on acquired element capture energy spectrum well logging data, establishing a well logging curve response equation set according to the yields of the elements after the normalization processing and a pre-established stratum rock interpretation model, and calculating stratum rock component contents using the established well logging curve response equation set and an optimization algorithm, the embodiments of the present disclosure avoid "oxygen closing" processing in the element capture energy spectrum well logging data processing and conversion steps from elements to minerals, and comprehensively process the conventional well logging data and the element capture energy spectrum well logging data, thereby increasing the calculation precision of the stratum rock component contents.

BRIEF DESCRIPTION OF THE DRAWINGS

In order to more clearly describe the technical solutions in the embodiments of the present disclosure or the prior art, the drawings to be used in the descriptions of the embodiments or the prior art will be briefly introduced as follows. Obviously, the drawings in the following descriptions just illustrate some embodiments of the present disclosure, and a person skilled in the art can obtain other drawings from them without paying any creative labor.

DETAILED DESCRIPTION OF THE PREFERRED EMBODIMENTS

The embodiments of the present disclosure provide a method and device for acquiring stratum rock component contents.

In order that a person skilled in the art better understands the technical solutions in the present disclosure, the technical solutions in the embodiments of the present disclosure will be clearly and completely described with reference to the drawings in the embodiments of the present disclosure. Obviously, those described are just parts, rather than all, of the embodiments of the present disclosure. Any other embodiment obtained by a person skilled in the art based on the embodiments of the present disclosure without paying any creative labor shall fall within the protection scope of the present disclosure.

Figure 1:
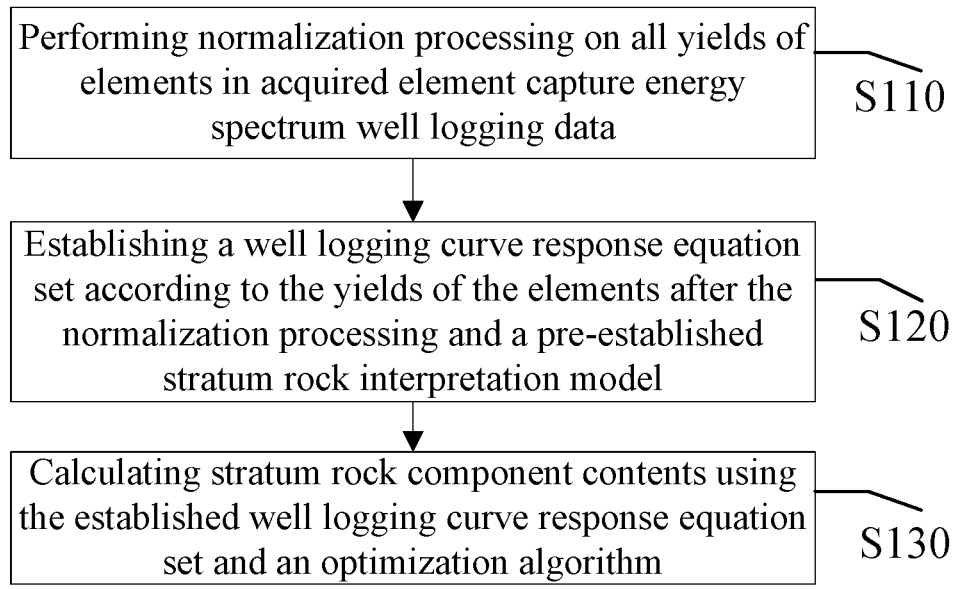
FIG. 1 illustrates a flow diagram of a method for acquiring stratum rock component contents provided by an embodiment of the present disclosure.

Next, a method for acquiring stratum rock component contents of the present disclosure will be described in details with reference to the drawings. Although the present disclosure provides methodical operation steps as described in the following embodiment or flow diagram, more or less operation steps may be included in the method based on the conventional labor or a non-inventive labor. The execution orders of the steps having no necessary causal relation in logics are not limited to those provided in the embodiments of the present disclosure. FIG. 1 illustrates a flow diagram of a method for acquiring stratum rock component contents provided by an embodiment of the present disclosure. The method comprises the steps of:

S110: performing normalization processing on all yields of elements in acquired element capture energy spectrum well logging data.

After element capture energy spectrum well logging data of a target area is acquired, the normalization processing may be performed on yields of elements in the measured stratum rock components using a normalization equation.

The target area may be the whole or a part of the exploration area.

The element capture energy spectrum well logging data may be the data obtained by measuring the target area with a capture energy spectrum well logging method, and may include yields of elements such as silicon, aluminum, sodium, potassium, calcium, magnesium, iron, sulfur and titanium in the stratum rock. The capture energy spectrum well logging method may be a method in which fast neutrons are transmitted to a stratum from a chemical source, converted into thermal neutrons after multiple inelastic collisions in the stratum, and finally captured by surrounding atoms, while the elements return to the original state by releasing gamma rays.

The normalization processing of the yields of the elements may be performed using the following equation:

$$ny_k = \frac{w_k \cdot y_k}{\sum_{l=1}^{ne} w_l \cdot y_l} \quad (1)$$

wherein $ny_k$ denotes a yield of a k-th element after the normalization processing; $w_k$ denotes a yield normalization coefficient of the k-th element; $y_k$ denotes a yield of the k-th element before the normalization processing; ne denotes the number of element types; $w_l$ and $y_l$ denote a yield normalization coefficient of an l-th element and a yield thereof before the normalization processing, respectively.

The yield normalization coefficient of an element is relevant to an element content in an oxide corresponding to the element, and the yield normalization coefficients of conventional elements are shown in the following Table 1:

TABLE 1

| Yield Normalization Coefficients of Conventional Elements | | | | | | |
|---|---|---|---|---|---|---|
| Element | Si | Ca | Fe | S | Ti | ... |
| Yield normalization coefficient | 2.14 | 1.52 | 0.23 | 0.01 | 0.09 | ... |

After the normalization processing is performed on the yields of the elements, an element yield curve may be constructed. The element yield curve records a second actual well logging response value corresponding to each depth point in a certain depth range, i.e., the yields of the elements after the normalization processing. The depth point may be a point of a certain depth.

S120: establishing a well logging curve response equation set according to the yields of the elements after the normalization processing and a pre-established stratum rock interpretation model.

The well logging curve response equation set may be established using the obtained yields of the elements after the normalization processing and the pre-established stratum rock interpretation model.

The stratum rock component interpretation model may be established according to main mineral component types, trace mineral types and stratum fluid types of the stratum rock in the target area determined using the acquired well logging data, core analysis data, fluid analysis data and geological conditions of the target area. The established stratum rock model may include type information of a rock existed in the target area.

The well logging data may comprise the conventional well logging data and the element capture energy spectrum well logging data. The core analysis data may be used for analyzing different positions and lithologies of the core, so as to deepen the understanding of the stratum rock characteristics, and may comprise coring descriptions, physical property analysis data, total rock oxide data, rock electrical property experimental data, etc. The fluid analysis data may be used for recognizing stratum fluid types and stratum water properties, comprising stratum test data, stratum water analysis data, etc.

For example, in well A of Southwest Oil and Gas Field, a well section of 2350.00 m to 2405.00 m is continuously cored. The core shows that an upper portion of the well section has a lithology of black shale, and a lower portion thereof gradually transitions to limestone. The core analysis shows that the main stratum mineral types of the well section are clay, quartz, calcite and dolomite, a minute amount of pyrite is contained, and the pore fluid components are stratum water and natural gas. Thus, the established stratum rock interpretation model comprises clay, quartz, calcite, dolomite, pyrite, stratum water and natural gas.

To be noted, the execution orders of establishing the stratum rock interpretation model and performing the normalization processing of the yields of the elements are not limited.

Figure 2:
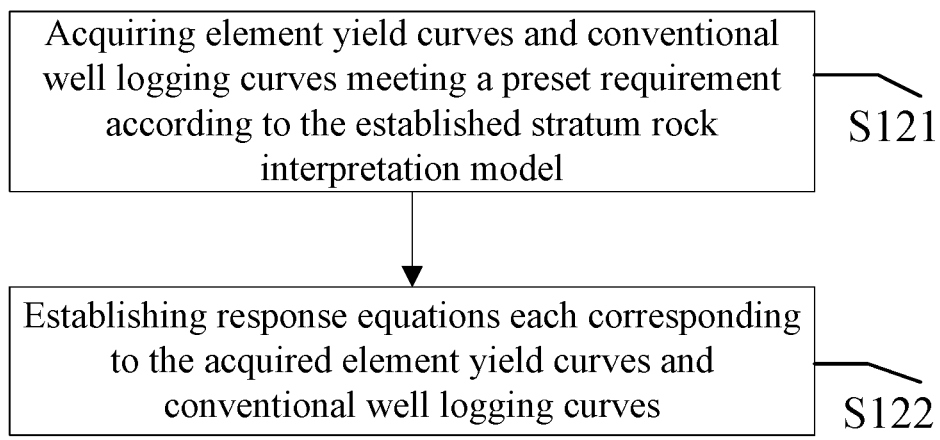
FIG. 2 illustrates a flow diagram of substeps of step S120.

Step S120 specifically may comprise the following sub-steps, as illustrated in FIG. 2:

S121: acquiring element yield curves and conventional well logging curves meeting a preset requirement according to the established stratum rock interpretation model.

The preset requirement may mean having obvious response characteristics with respect to the change of the stratum rock mineral or fluid.

Acquiring element yield curves and conventional well logging curves meeting a preset requirement according to the established stratum rock interpretation model may mean acquiring element yield curves and conventional well logging curves which can reflect relevant characteristics of mineral components and/or fluid components according to the mineral components and/or the fluid components included in the stratum rock interpretation model.

The conventional well logging curve may be acquired from well logging data obtained by a well logging with a conventional well logging method, and it records a first actual well logging response value corresponding to each depth point in a certain depth range. The element yield curve is acquired by performing normalization processing of the yields of the elements obtained by measuring the element capture energy spectrum well logging, and it records a second actual well logging response value corresponding to each depth point in a certain depth range. The depth point may be a point of a certain depth.

Various well logging curves reflect different stratum information characteristics. For example, in the conventional well logging, it is generally recognized that the natural gamma curve mainly reflects a total amount of stratum clay minerals, the tri-porosity curve mainly reflects a stratum pore development degree, and the resistivity curve mainly reflects a change of intrapore fluid components. The stratum minerals reflected by the element yield curves are also inconsistent with each other. For example, an aluminum (Al) element yield curve reflects a stratum clay mineral content; a silicon (Si) element yield curve indicates a change of a stratum quartz content; a calcium (Ca) element yield curve mainly reflects a carbonatite mineral content in a stratum, and it is relevant to a calcite content and a dolomite content in the stratum; a potassium (K) element yield curve and a sodium (Na) element yield curve well indicate feldspar mineral components in a stratum; an iron (Fe) element yield curve mainly reflects iron-bearing minerals such as pyrite and siderite in a stratum; the sulfur (S) element yield curve can also well reflect a stratum pyrite content. Thus, corresponding well logging curves can be acquired according to the mineral components included in the established stratum rock interpretation model. For example, in well A, the established stratum rock interpretation model includes clay, quartz, calcite, dolomite, pyrite, stratum water and natural gas. Thus, for the stratum mineral and fluid types in the stratum rock interpretation model, the acquired well logging curves may include element yield curves of Al, Si, Ca, Fe and S, the natural gamma curve, the resistivity curve and the tri-porosity curve.

Preferably, the number of the acquired element yield curves and conventional well logging curves may be larger than that of mineral components in the stratum rock interpretation model.

S122: establishing response equations each corresponding to the acquired element yield curves and conventional well logging curves.

After the element yield curves and the conventional well logging curves are acquired, corresponding response equations may be established, respectively, to constitute the well logging curve response equation set. The well logging curves may comprise the element yield curve and the conventional well logging curve.

Establishing response equations each corresponding to the acquired element yield curves and conventional well logging curves may mean establishing relational expressions between the theoretical well logging response values each corresponding to the acquired element yield curves and conventional well logging curves and volume percentage contents of stratum rock components.

For each depth point, the response equation corresponding to the established conventional well logging curve may be represented as:

$$t_{ck,1} = \sum_{i=1}^{m} v_i \cdot R_i + \sum_{j=1}^{f} v_j \cdot R_j \qquad (2)$$

wherein $t_{ck1}$ denotes a theoretical well logging response value corresponding to a k-th conventional well logging curve acquired; $v_i$ and $v_j$ denote volume percentage contents of each mineral component and fluid component of a stratum, respectively; $R_i$ and $R_j$ denote well logging response parameters of each mineral and fluid, respectively; m and f denote the number of the minerals and fluids in a stratum rock, respectively; i, j and k are all positive integers.

The response equation corresponding to each conventional well logging curve acquired may be established using equation (2).

For example, a response equation corresponding to the natural gamma well logging curve may be represented as:

$$t_{cGR} = v_{caly} \cdot GR_{clay} + v_{quar} \cdot GR_{quar} + v_{calc} \cdot GR_{calc} + v_{dolo} \cdot GR_{dolo} + v_{pyri} \cdot GR_{pyri} + v_{water} \cdot GR_{water} + v_{gas} \cdot GR_{gas} \qquad (3)$$

wherein $t_{cGR}$ denotes a theoretical well logging response value corresponding to the natural gamma well logging curve; $v_{clay}$, $v_{quar}$, $v_{calc}$, $v_{dolo}$, $v_{pyri}$, $v_{water}$ and $v_{gas}$ denote volume percentage contents of clay, quartz, calcite, dolomite, pyrite, stratum water and natural gas, respectively; $GR_{clay}$, $GR_{quar}$, $GR_{calc}$, $GR_{dolo}$, $GR_{pyri}$, $GR_{water}$ and $GR_{gas}$ denote natural gamma well logging response parameters of clay, quartz, calcite, dolomite, pyrite, stratum water and natural gas, respectively.

For each depth point, the response equation corresponding to the established element yield curve may be represented as:

$$t_{ck,2} = \sum_{i=1}^{m} (v_i \cdot \rho_i \cdot R_i) \bigg/ \sum_{i=1}^{m} (v_i \cdot \rho_i) \qquad (4)$$

wherein $t_{ck2}$ denotes a theoretical well logging response value corresponding to a k-th element yield curve acquired; $\rho_i$ denotes a density value of an i-th stratum mineral, and it is a constant.

The response equation corresponding to each conventional well logging curve acquired may be established using equation (4).

For example, a response equation corresponding to the stratum calcium element yield curve may be represented with equation (5):

$$t_{cCa} = (v_{caly} \cdot \rho_{clay} \cdot Ca_{clay} + v_{quar} \cdot \rho_{quar} \cdot Ca_{quar} + v_{calc} \cdot \rho_{calc} \cdot Ca_{calc} + v_{dolo} \cdot \rho_{dolo} \cdot Ca_{dolo} + v_{pyri} \cdot \rho_{pyri} \cdot Ca_{pyri})/(v_{caly} \cdot \rho_{clay} + v_{quar} \cdot \rho_{quar} + v_{calc} \cdot \rho_{calc} + v_{dolo} \cdot \rho_{dolo} + v_{pyri} \cdot \rho_{pyri}) \quad (5)$$

wherein $t_{cCa}$ denote a theoretical well logging response value corresponding to the calcium element yield curve; $Ca_{clay}$, $Ca_{quar}$, $Ca_{calc}$, $Ca_{dolo}$ and $Ca_{pyri}$ denote calcium element well logging response parameters of clay, quartz, calcite, dolomite and pyrite, respectively; $\rho_{clay}$, $\rho_{quar}$, $\rho_{calc}$, $\rho_{dolo}$ and $\rho_{pyri}$ denote mineral densities of clay, quartz, calcite, dolomite and pyrite, respectively.

The well logging response parameters in equations (2) to (5) may be determined with a method that combines a rock element mineral experiment with a theoretical value calculation. The well logging response parameters in equations (2) to (3) may also take the technicians' empirical values or values acquired with other methods in the prior art.

Regarding most of conventional minerals, their chemical components are fixed, and their well logging response parameters can be directly obtained through the theoretical value calculation. For example, the specific calculation equation for the well logging response parameters in equations (4) to (5) may be represented as:

$$PA_B = Ar_A * N_A / Mr_B, \quad (6)$$

wherein $PA_B$ denotes a well logging response parameter of element A in mineral B of the stratum; $Ar_A$ denotes a relative atomic weight of element A in mineral B; $N_A$ denotes the number of atoms of element A in mineral B; $Mr_B$ denotes a molecular weight of mineral B.

Regarding a mineral having complex chemical components and various changes, a total rock oxide analysis and assay may be performed on the mineral components through experiment measures, so as to directly determine the element well logging response parameter. For example, each element well logging response parameter for the mineral components can be determined with a method such as X-ray Diffraction (XRD), X-ray Fluorescence (XRF), Fourier transform infrared spectrum analyzer (FTIR), etc.

During an implementation, experimental methods are taken to determine the variation range and optimal values of element well logging response parameters in acquired core samples of a plurality of oil field blocks in the east and west of China. For example, it is possible to determine the element well logging response parameters of sixteen conventional stratum minerals, such as quartz, sodium feldspar, potassium feldspar, calcite and dolomite, in the above oil fields, as shown in Table 2:

TABLE 2

Element Well Logging Response Parameters of Conventional Stratum Minerals

| Mineral | Silicon (%) | Aluminum (%) | Sodium (%) | Potassium (%) | Calcium (%) | Magnesium (%) | Sulfur (%) | Iron (%) | Titanium (%) |
|---|---|---|---|---|---|---|---|---|---|
| Quartz | 46.74 | 0 | 0 | 0 | 0 | 0 | 0 | 0 | 0 |
| Orthoclase | 30.27 | 9.69 | 0 | 14.05 | 0 | 0 | 0 | 0 | 0 |
| Sodium feldspar | 32.13 | 10.29 | 8.77 | 0 | 0 | 0 | 0 | 0 | 0 |
| Calcium feldspar | 20.19 | 19.40 | 0 | 0 | 14.41 | 0 | 0 | 0 | 0 |
| Calcite | 0 | 0 | 0 | 0 | 39.54 | 0.37 | 0 | 0 | 0 |
| Dolomite | 0 | 0 | 0 | 0 | 21.27 | 12.90 | 0 | 0 | 0 |
| Iron dolomite | 0 | 0 | 0 | 0 | 10.40 | 12.60 | 0 | 14.50 | 0 |
| Aragonite | 0 | 0 | 0 | 0 | 40.04 | 0 | 0 | 0 | 0 |
| Pyrite | 0 | 0 | 0 | 0 | 0 | 0 | 53.45 | 46.55 | 0 |
| Siderite | 0 | 0 | 0 | 0 | 0 | 0 | 0 | 48.20 | 0 |
| Illite | 24.00 | 12.00 | 0.40 | 6.90 | 0 | 1.20 | 0 | 6.50 | 0.80 |
| Montmorillonite | 21.00 | 9.00 | 0.50 | 0.50 | 0.20 | 2.00 | 0 | 1.00 | 0.20 |
| Kaolinite | 21.00 | 19.26 | 0.24 | 0.10 | 0.10 | 0.10 | 0 | 0.80 | 1.18 |
| Chlorite | 17.90 | 9.00 | 0.30 | 5.40 | 1.60 | 2.50 | 0 | 16.40 | 2.37 |
| White mica | 20.32 | 20.32 | 0 | 9.82 | 0 | 0 | 0 | 0 | 0 |
| Black mica | 18.20 | 6.00 | 0.40 | 7.20 | 0.20 | 7.70 | 0 | 13.60 | 1.50 |

S130: calculating stratum rock component contents using the established well logging response equation set and an optimization algorithm.

The stratum rock component contents may comprise the mineral component contents and the fluid component contents. In this embodiment, calculating stratum rock component contents may mean calculating volume percentage contents of each mineral component and fluid component in a stratum rock.

After the response equations corresponding to the acquired conventional well logging curves and the response equations corresponding to the acquired element yield curves are established, the mineral component contents of the stratum rock may be calculated using the established response equations and the optimization algorithm.

Specifically, after the response equations are established, an optimization target function may be established with a least square method. The established target function may be represented as:

$$v^* = \mathrm{argmin}\{F(v)\} \quad (7)$$

$$F(v) = \frac{1}{2}\left\{\sum_{k1=1}^{n1}[(t_{ck1} - t_{mk1}) \cdot w_{k1}]^2 + \sum_{k2=1}^{n2}[(t_{ck2} - t_{mk2}) \cdot w_{k2}]^2\right\} \quad (8)$$

wherein $t_{ck1}$ denotes a theoretical well logging response value corresponding to a conventional well logging curve, and $t_{ck1}$ denotes a theoretical well logging response value corresponding to an element yield curve; $t_{mk1}$ denotes a first actual well logging response value corresponding to $t_{ck1}$ and $t_{mk2}$ denotes a second actual well logging response value corresponding to $t_{ck2}$, namely yields of elements after the normalization processing; $w_{k1}$ denotes a weight coefficient of a conventional well logging curve in an optimization model, $w_{k2}$ denotes a weight coefficient of an element yield curve in the optimization model, and the values of the two weight coefficients may be determined based on the quality of the well logging curve; n1 and n2 are the number of the acquired conventional well logging curves and element yield curves, respectively; k1 and k2 are positive integers.

The mineral component contents and the fluid component contents in the stratum rock may be calculated using the established target function and a non-linear optimization algorithm after establishing the target function. Namely, the theoretical well logging response values (i.e., equations (2) and (4)) corresponding to the acquired well logging curves and corresponding actual well logging response values are plugged into equations (7) and (8); equation (8) may be solved using the non-linear optimization algorithm to calculate a value of the target function F(v); the volume percentage contents of each mineral component and/or fluid component in the stratum may be continuously adjusted with an optimization method, so that the value of the target function F(v) becomes minimum; at that time, the volume percentage contents of each mineral component and/or fluid component are those finally determined for the stratum rock.

To be noted, the volume percentage contents of the mineral component and the fluid component in equation (8) may be restricted in a certain range, so that a sum of the volume percentage contents of all the components is 1, while preset constraint conditions can be met. The constraint conditions may be defined, by an interpreter based on empirical knowledge, for the range of the mineral component content and the fluid component content in the stratum rock component interpretation model, including maximum and minimum values of the mineral content, maximum and minimum values of the stratum porosity, etc. The constraint conditions may be set before or after the stratum rock component interpretation model is established.

After each mineral component content and fluid component content in the stratum rock are calculated, the stratum lithology, the advantageous parts for reservoir development, and the fluid properties can be determined. For example, when the calcite content is high while the clay and dolomite contents are low in the stratum after a calculation, it may be judged that the stratum is a limestone stratum; and when hydrocarbon is dominant in the calculated fluid, it may be judged that the stratum is a hydrocarbon bearing stratum.

Figure 3:
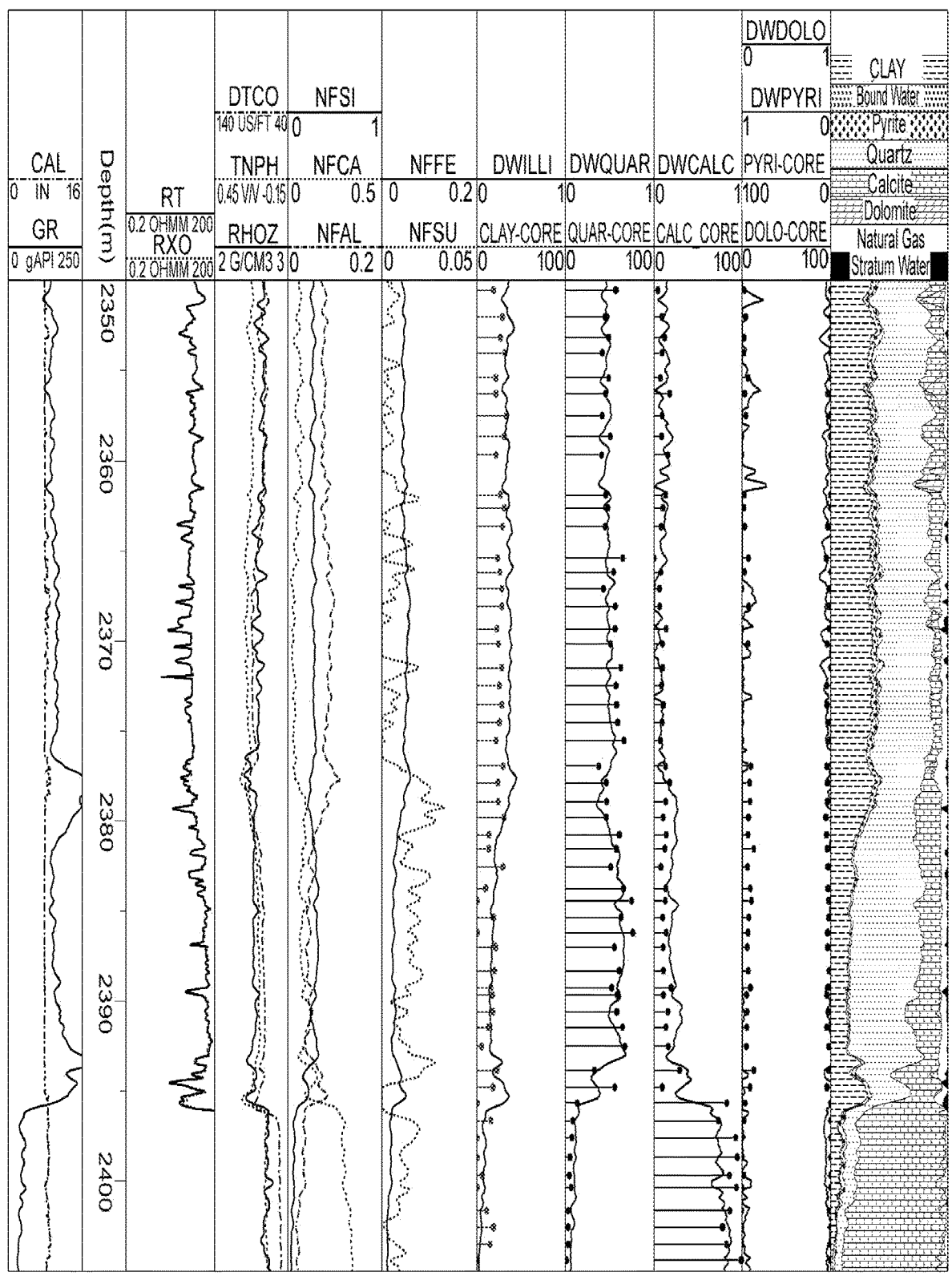
FIG. 3 illustrates a comparison diagram between a calculation result of stratum rock component contents of well A of Southwest Oil and Gas Field and a lab analysis result.

FIG. 3 illustrates a comparison diagram between a calculation result of stratum rock component contents of well A of Southwest Oil and Gas Field and a lab analysis result. The rightmost column in FIG. 3 is a component section obtained by processing well A with a stratum rock component content calculation method proposed by the present disclosure. The second to fifth columns from right (i.e., the seventh to tenth columns from left) are comparisons between calculation results of the method provided by the embodiment of the present disclosure and the coring analysis result. As can be seen from those columns, the mineral component contents of clay, quartz and calcite of the stratum calculated with the method provided by the embodiment of the present disclosure are consistent with the core experimental analysis result. The fifth and sixth columns from left are element yield curves of aluminum, silicon, calcium, iron and sulfur of the stratum after the normalization processing. As can be seen from the first column from right in FIG. 3, in the reservoir within a section of 2364.00 m to 2395.00 m, the pores are well developed, and the total amounts of natural gas and stratum water (white and black filled parts) are high, wherein natural gas (white filled parts) are dominant. Thus, it can be judged that the pores in that section are mainly filled of natural gas, which is an advantageous exploration portion for shale gas reservoir.

As can be seen from the above steps, the embodiments of the present disclosure perform normalization processing of yields of elements using acquired element capture energy spectrum well logging data; establish a well logging curve response equation set according to the element yield curves acquired after the normalization processing and a pre-established stratum rock interpretation model, the well logging curve response equation set comprising response equations corresponding to conventional well logging curves and the element yield curves; and calculate stratum rock component contents using the established well logging response equation set and an optimization algorithm. The method provided by the embodiments of the present disclosure not only avoids "oxygen closing" processing in the element capture energy spectrum well logging data processing and conversion steps from elements to minerals, but also comprehensively processes the conventional well logging data and the element capture energy spectrum well logging data, thereby increasing the calculation precision of the stratum rock component contents, reducing the calculation amount, and improving the calculation efficiency. The method is also well adaptive for the reservoir evaluations of various complex lithologies.

Figure 4:
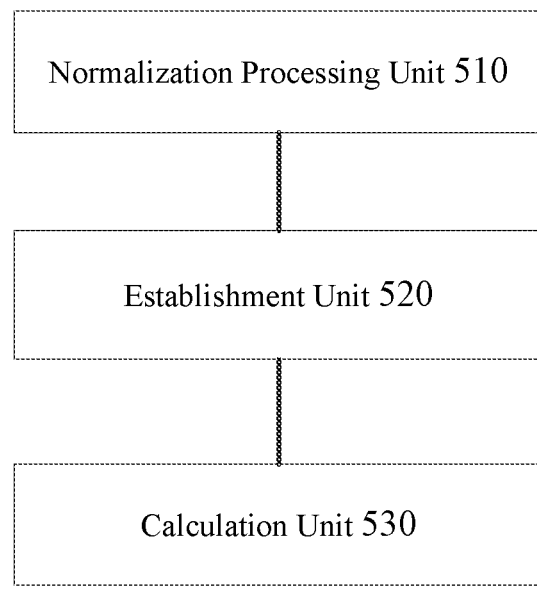
FIG. 4 illustrates a block diagram of a device for calculating stratum rock component contents provided by an embodiment of the present disclosure.

The embodiments of the present disclosure further provide a device for acquiring stratum rock component contents. As illustrated in FIG. 4, the device comprises a normalization processing unit 510, an establishment unit 520 and a calculation unit 530, wherein the normalization processing unit 510 may be configured to perform normalization processing of yields of elements in acquired element capture energy spectrum well logging data; the establishment unit 520 may be configured to establish a well logging curve response equation set according to the yields of the elements after the normalization processing and a pre-established stratum rock interpretation model; and the calculation unit may be configured to calculate stratum rock component contents using the established well logging response equation set and an optimization algorithm.

In an embodiment, the establishment unit 520 may comprise (not illustrated):

an acquisition subunit configured to acquire element yield curves and conventional well logging curves meeting a preset requirement according to the established stratum rock interpretation model;

a first establishment subunit configured to establish response equations corresponding to the acquired element yield curves and conventional well logging curves, respectively. The established response equations may be as shown in equations (2) and (4).

In an embodiment, the calculation unit 530 may comprise (not illustrated):

a second establishment subunit configured to establish a target function using the well logging curve response equation set;

a calculation subunit configured to calculate volume percentage contents of each mineral component and fluid component in a stratum rock using the target function.

As can be seen from the above description, by providing a normalization processing unit configured to perform normalization processing of yields of elements acquired by measuring the element capture energy spectrum well logging, an establishment unit configured to establish a well logging curve response equation set comprising response equations corresponding to conventional well logging curves and element yield curves, and a calculation unit configured to calculate stratum rock component contents, the embodiment of the present disclosure increases the calculation precision of the stratum rock component contents.

The embodiments of the present disclosure further provide a computer readable storage medium, wherein the computer readable storage medium stores a computer program which causes the processor to perform the following operations when being executed: performing normalization processing on all yields of elements in acquired element capture energy spectrum well logging data; establishing a well logging curve response equation set according to the yields of the elements after the normalization processing and a pre-established stratum rock interpretation model; and calculating stratum rock component contents using the established well logging curve response equation set and an optimization algorithm.

In an embodiment, the computer readable instructions cause the processor to calculate the yields of the elements using the following equation:

$$ny_k = \frac{w_k \cdot y_k}{\sum_{l=1}^{ne} w_l \cdot y_l}$$

wherein $ny_k$ denotes a yield of a k-th element after the normalization processing; $w_k$ denotes a yield normalization coefficient of the k-th element; $y_k$ denotes a yield of the k-th element before the normalization processing; ne denotes the number of element types; $w_l$ and $y_l$ denote a yield normalization coefficient of an 1-th element and a yield thereof before the normalization processing, respectively.

In an embodiment, the computer readable instructions cause the processor to acquire element yield curves and conventional well logging curves meeting a preset requirement according to the established stratum rock interpretation model; establish response equations each corresponding to the acquired element yield curves and conventional well logging curves.

In an embodiment, the computer readable instructions cause the processor to establish relational expressions between the theoretical well logging response values each corresponding to the acquired element yield curves and conventional well logging curves and volume percentage contents of stratum rock components.

In an embodiment, the computer readable instructions cause the processor to establish a target function using the well logging curve response equation set; calculate volume percentage contents of each mineral component and fluid component in a stratum rock using the target function.

Figure 5:
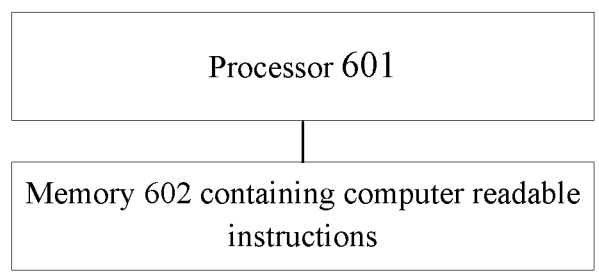
FIG. 5 illustrates a device for acquiring stratum rock component contents provided by an embodiment of the present disclosure.

The embodiments of the present disclosure further provide a device for acquiring stratum rock component contents. As illustrated in FIG. 5, the device comprises a processor 601; and a memory 602 containing computer readable instructions which when being executed, cause the processor to perform the operations of: performing normalization processing on all yields of elements in acquired element capture energy spectrum well logging data; establishing a well logging curve response equation set according to the yields of the elements after the normalization processing and a pre-established stratum rock interpretation model; and calculating stratum rock component contents using the established well logging curve response equation set and an optimization algorithm.

In an embodiment, the computer readable instructions cause the processor to calculate the yields of the elements using the following equation:

$$ny_k = \frac{w_k \cdot y_k}{\sum_{l=1}^{ne} w_l \cdot y_l}$$

wherein $ny_k$ denotes a yield of a k-th element after the normalization processing; $w_k$ denotes a yield normalization coefficient of the k-th element; $y_k$ denotes a yield of the k-th element before the normalization processing; ne denotes the number of element types; $w_l$ and $y_l$ denote a yield normalization coefficient of an 1-th element and a yield thereof before the normalization processing, respectively.

In an embodiment, the computer readable instructions cause the processor to acquire element yield curves and conventional well logging curves meeting a preset requirement according to the established stratum rock interpretation model; establish response equations each corresponding to the acquired element yield curves and conventional well logging curves.

In an embodiment, the computer readable instructions cause the processor to establish relational expressions between the theoretical well logging response values each corresponding to the acquired element yield curves and conventional well logging curves and volume percentage contents of stratum rock components.

In an embodiment, the computer readable instructions cause the processor to establish a target function using the well logging curve response equation set; calculate volume percentage contents of each mineral component and fluid component in a stratum rock using the target function.

The device or unit elaborated in the above embodiment specifically may be implemented by a computer chip or entity, or a product having a certain function. For the convenience of description, the device is described through various units based on the functions. Of course, the functions of the units may be realized in one or more software and/or hardware during the implementation of the present disclosure.

From the description of the above embodiments, a person skilled in the art may further acquire that various illustrative logical blocks, units and steps listed in the embodiments of the present disclosure can be realized by hardware, software or a combination thereof, depending on the specific application and the design requirement of the whole system. With respect to each specific application, a person skilled in the art may realize the functions with various methods, which shall not be understood as going beyond the protection scope of the embodiments of the present disclosure.

The steps of the method or the algorithm described in the embodiments of the present disclosure may be directly embedded into hardware, a software module executed by a processor, or a combination thereof. The software module may be stored in a Random-Access Memory (RAM), a flash memory, a Read-Only Memory (ROM), an Electrically Programmable ROM (EPROM), an Electrically Erasable Programmable ROM (EEPROM), a register, a hard disc, a removable disc, a Compact Disc-ROM (CD-ROM) or a storage medium of any other form in the art. For example, the storage medium may be connected to the processor, so that the processor can read and write information from and into the storage medium. Optionally, the storage medium may also be integrated into the processor. The processor and the storage medium may be disposed in an Application Specific Integrated Circuit (ASIC) that may be provided in a user terminal. Optionally, the processor and the storage medium may also be disposed in different parts of the user terminal.

In one or more example designs, the functions described by the embodiments of the present disclosure may be realized by hardware, software, firmware or combinations thereof. When being realized in software, the functions may be stored in a computer readable medium, or transmitted therein in the form of one or more instructions or codes. The computer readable medium includes a computer storage medium and a communication medium that facilitates a computer program to be transferred from one place to another place. The storage medium may be an available medium that can be accessed by any general or special computer. For example, such a computer readable medium may include, but not limited to, an RAM, an ROM, an EEPROM, a CD-ROM, other optical disc storage, other magnetic disc storage, other magnetic storage device, or any other medium for bearing or storing program codes in the form of instructions or data structures and other forms readable by a general or special computer or processor.

The embodiments herein are described in a progressive manner, and the same or similar parts of the embodiments can refer to each other. Each embodiment lays an emphasis on its distinctions from other embodiments. In particular, the device embodiment is simply described since it is substantially similar to the method embodiment, and please refer to the description of the method embodiment for the relevant portion.

Although the present disclosure is described through the above embodiments, a person skilled in the art shall appreciate that various modifications and changes can be made to the present disclosure without deviating from the spirit of the present disclosure. It is intended that the appended claims include those modifications and changes without deviating from the spirit of the present disclosure.

The invention claimed is:

1. A method for acquiring stratum rock component contents, wherein the method comprising:
acquiring element capture energy spectrum well logging data by transmitting fast neutrons to a stratum from a chemical source;
performing normalization processing on all yields of elements in acquired element capture energy spectrum well logging data;
establishing a well logging curve response equation set according to the yields of the elements after the normalization processing and a pre-established stratum rock interpretation model; and
calculating stratum rock component contents using the established well logging curve response equation set and an optimization algorithm;
wherein performing normalization processing on all yields of elements comprises calculating the yields of the elements using the following equation:

$$ny_k = \frac{w_k \cdot y_k}{\sum_{l=1}^{ne} w_l \cdot y_l}$$

wherein $ny_k$ denotes a yield of a k-th element after the normalization processing; $W_k$ denotes a yield normalization coefficient of the k-th element; $y_k$ denotes a yield of the k-th element before the normalization processing; ne denotes the number of element types; $w_l$ and $y_l$ denote a yield normalization coefficient of an l-th element and a yield thereof before the normalization processing, respectively.

2. The method according to claim 1, wherein establishing a well logging curve response equation set according to the yields of the elements after the normalization processing and a pre-established stratum rock interpretation model comprises:
acquiring element yield curves and conventional well logging curves meeting a preset requirement according to the established stratum rock interpretation model;
establishing response equations each corresponding to the acquired element yield curves and conventional well logging curves.

3. The method according to claim 2, wherein establishing response equations each corresponding to the acquired element yield curves and conventional well logging curves comprises establishing relational expressions between theoretical well logging response values each corresponding to the acquired element yield curves and conventional well logging curves and volume percentage contents of stratum rock components.

4. The method according to claim 3, wherein the established relational expressions are represented as:

$$t_{ck,1} = \sum_{i=1}^{m} v_i \cdot R_i + \sum_{j=1}^{f} v_j \cdot R_j$$

$$t_{ck,2} = \sum_{i=1}^{m} (v_i \cdot \rho_i \cdot R_i) \bigg/ \sum_{i=1}^{m} (v_i \cdot \rho_i)$$

wherein $t_{ck1}$ denotes a theoretical well logging response value corresponding to a k-th conventional well logging curve acquired; $t_{ck2}$ denotes a theoretical well logging response value corresponding to a k-th element yield curve acquired; $v_i$ and $v_j$ denote volume percentage contents of each mineral component and fluid component of a stratum, respectively; $R_i$ and $R_j$ denote well logging response parameters of each mineral and fluid, respectively; $\rho_i$ denotes a density value of an i-th stratum mineral; m and f denote the number of the minerals and fluids in a stratum rock, respectively; i, j and k are all positive integers.

5. The method according to claim 4, wherein the well logging response parameters are determined with a method that combines a rock element mineral experiment with a theoretical value calculation.

6. The method according to claim 1, wherein calculating stratum rock component contents using the established well logging curve response equation set and an optimization algorithm comprises:

establishing a target function using the well logging curve response equation set;

calculating volume percentage contents of each mineral component and fluid component in a stratum rock using the target function.

7. A non-transitory computer-readable storage medium, wherein the non-transitory computer readable storage medium stores a computer program which executes the method according to claim 1.

8. A computer device, comprising a memory, a processor and a computer program stored in the memory and executable in the processor, wherein the processor performs the following operations when executing the computer program:

performing normalization processing on all yields of elements in acquired element capture energy spectrum well logging data, wherein the element capture energy spectrum well logging data is acquired by transmitting fast neutrons to a stratum from a chemical source;

establishing a well logging curve response equation set according to the yields of the elements after the normalization processing and a pre-established stratum rock interpretation model; and calculating stratum rock component contents using the established well logging curve response equation set and an optimization algorithm;

wherein performing normalization processing on all yields of elements comprises calculating the yields of the elements using the following equation:

$$ny_k = \frac{w_k \cdot y_k}{\sum_{l=1}^{ne} w_l \cdot y_l}$$

wherein $ny_k$ denotes a yield of a k-th element after the normalization processing; $W_k$ denotes a yield normalization coefficient of the k-th element; $y_k$ denotes a yield of the k-th element before the normalization processing; ne denotes the number of element types; $W_l$ and $y_l$ denote a yield normalization coefficient of an l-th element and a yield thereof before the normalization processing, respectively.

9. The computer device according to claim 8, wherein establishing a well logging curve response equation set according to the yields of the elements after the normalization processing and a pre-established stratum rock interpretation model comprises:

acquiring element yield curves and conventional well logging curves meeting a preset requirement according to the established stratum rock interpretation model;

establishing response equations each corresponding to the acquired element yield curves and conventional well logging curves.

10. The computer device according to claim 9, wherein establishing response equations each corresponding to the acquired element yield curves and conventional well logging curves comprises establishing relational expressions between theoretical well logging response values each corresponding to the acquired element yield curves and conventional well logging curves and volume percentage contents of stratum rock components.

11. The computer device according to claim 10, wherein the established relational expressions are represented as:

$$t_{ck,1} = \sum_{i=1}^{m} v_i \cdot R_i + \sum_{j=1}^{f} v_j \cdot R_j$$

$$t_{ck,2} = \sum_{i=1}^{m} (v_i \cdot \rho_i \cdot R_i) \bigg/ \sum_{i=1}^{m} (v_i \cdot \rho_i)$$

wherein $t_{ck1}$ denotes a theoretical well logging response value corresponding to a k-th conventional well logging curve acquired; $t_{ck2}$ denotes a theoretical well logging response value corresponding to a k-th element yield curve acquired; $v_i$ and $v_j$ and denote volume percentage contents of each mineral component and fluid component of a stratum, respectively; $R_i$ and $R_j$ denote well logging response parameters of each mineral and fluid, respectively; $\rho_i$ denotes a density value of an i-th stratum mineral; m and f denote the number of the minerals and fluids in a stratum rock, respectively; i, j and k are all positive integers.

12. The computer device according to claim 11, wherein the well logging response parameters are determined with a method that combines a rock element mineral experiment with a theoretical value calculation.

13. The computer device according to claim 8, wherein calculating stratum rock component contents using the established well logging curve response equation set and an optimization algorithm comprises:

establishing a target function using the well logging curve response equation set;

calculating volume percentage contents of each mineral component and fluid component in a stratum rock using the target function.

* * * * *